US012724010B2

(12) United States Patent
Shibamoto et al.

(10) Patent No.: US 12,724,010 B2
(45) Date of Patent: Sep. 1, 2026

(54) GAS ANALYSIS SYSTEM

(71) Applicant: SHIMADZU CORPORATION, Kyoto (JP)

(72) Inventors: Shigeaki Shibamoto, Kyoto (JP); Wenjian Lu, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 286 days.

(21) Appl. No.: 18/586,063

(22) Filed: Feb. 23, 2024

(65) Prior Publication Data

US 2024/0329015 A1 Oct. 3, 2024

(30) Foreign Application Priority Data

Mar. 29, 2023 (JP) ................................ 2023-053039

(51) Int. Cl.
*G01N 30/46* (2006.01)
*B01D 53/02* (2006.01)
*G01N 30/32* (2006.01)
*G01N 30/02* (2006.01)

(52) U.S. Cl.
CPC ........... *G01N 30/46* (2013.01); *B01D 53/025* (2013.01); *G01N 30/32* (2013.01); *G01N 2030/025* (2013.01); *G01N 2030/328* (2013.01)

(58) Field of Classification Search
CPC .. G01N 30/46; G01N 30/32; G01N 2030/025; G01N 2030/328; B01D 53/025
See application file for complete search history.

(56) References Cited

U.S. PATENT DOCUMENTS 7,451,634 B2 * 11/2008 Gamache ............. G01N 30/461 73/23.35
7,594,999 B2 * 9/2009 Brann .................. G01N 30/466 210/659
12,306,147 B2 * 5/2025 Quint ...................... G01N 30/74
2015/0089998 A1 * 4/2015 Tipler .................... G01N 30/66 73/23.42

(Continued)

FOREIGN PATENT DOCUMENTS

EP 4170341 A1 * 4/2023 ............. G01N 30/54
JP 2006064646 A * 3/2006

(Continued)

OTHER PUBLICATIONS

Chunxiao Wang, "GC Analysis of refinery gas," Agilent Technologies, Application 5989-7439 JAJP (Oct. 2, 2008) (NPL 1 cited in specification).

*Primary Examiner* — Jamel E Williams
(74) *Attorney, Agent, or Firm* — Muir Patent Law, PLLC

(57) ABSTRACT

A gas analysis system includes a first column, a second column, a merge portion connected to an outlet of the first column and an outlet of the second column, a detector that detects a gas component introduced from the merge portion, a switching valve arranged between the first column and the merge portion, and a controller. The controller performs delay processing of switching the switching valve between open and closed states so that timing of start of introduction of the gas component separated in the first column into the detector is delayed to be later than timing of completion of introduction of the gas component separated in the second column into the detector.

6 Claims, 20 Drawing Sheets

(56) References Cited

U.S. PATENT DOCUMENTS

| | | | | |
|---|---|---|---|---|
| 2018/0299413 | A1* | 10/2018 | Roques | G01N 30/46 |
| 2025/0164453 | A1* | 5/2025 | Lu | G01N 30/38 |

FOREIGN PATENT DOCUMENTS

| | | | | |
|---|---|---|---|---|
| JP | 4548139 | B2 * | 9/2010 | |
| JP | 2016080536 | A * | 5/2016 | |
| JP | 6380982 | B2 * | 8/2018 | |
| WO | WO-0045929 | A1 * | 8/2000 | G01N 30/466 |
| WO | WO-0188528 | A2 * | 11/2001 | G01N 30/34 |
| WO | WO-2020084737 | A1 * | 4/2020 | G01N 30/16 |

* cited by examiner

PRESSURE EQUILIBRIUM
1
11
CARRIER 1
43
42
M1
M2
CARRIER GAS
20
SAMPLE TANK
V1
V4
V7
23
V8
PL
V2
V9
21
PUMP (INACTIVE)
V3
V5
30
50
DETECTOR
V6
V10
CARRIER 2
12
41
44
CARRIER 3
13
OPEN
CLOSED
SAMPLE
CARRIER GAS

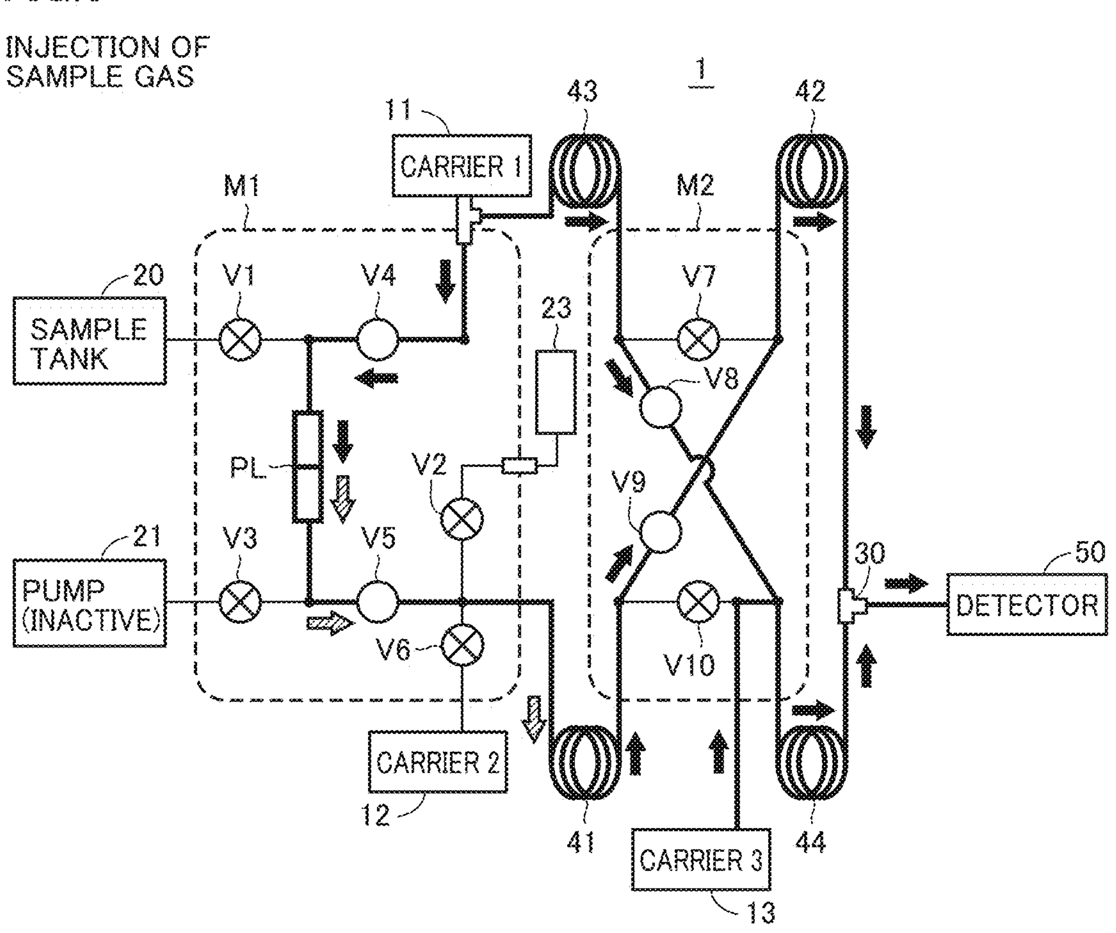
FIG.6
INJECTION OF SAMPLE GAS
1
11
CARRIER 1
43
42
M1
M2
20
SAMPLE TANK
V1
V4
V7
23
V8
PL
V2
V9
21
PUMP (INACTIVE)
V3
V5
30
50
DETECTOR
V6
V10
CARRIER 2
12
41
CARRIER 3
13
44
OPEN
CLOSED
SAMPLE
CARRIER GAS PRIMARY SEPARATION
1
11
CARRIER 1
43
42
M1
M2
20
SAMPLE TANK
V1
V4
V7
23
V8
PL
V2
V9
21
PUMP (INACTIVE)
V3
V5
30
50
DETECTOR
V6
V10
41
CARRIER 2
12
S3
S2
S1
44
CARRIER 3
13
OPEN
CLOSED
SAMPLE
CARRIER GAS

DETECTION OF S2

DETECTION OF S1
(DELAY PROCESSING)
1
11
CARRIER 1
43
42
M1
M2
20
SAMPLE TANK
V1
V4
V7
23
V8
PL
V2
V9
S1
21
PUMP (INACTIVE)
V3
V5
30
50
DETECTOR
V6
V10
S2
41
CARRIER 2
12
S3
44
CARRIER 3
13
OPEN
CLOSED
SAMPLE
CARRIER GAS

DETECTION OF S3
(DELAY CANCELLATION)

COMPARATIVE EXAMPLE (WITHOUT DELAY PROCESSING)
INTENSITY
TIME
$CO_2$
$C_2H_4$
$C_2H_6$
$N_2$
$CH_4$
CO + $C_3H_6$
$C_3H_8$
$C_3H_4$
PEAK OVERLAP
S2
S1
S3
PRESENT DISCLOSURE (WITH DELAY PROCESSING)
AVOID PEAK OVERLAP BY DELAYING ELUTION OF S3 BY SEALING COLUMN
INTENSITY
TIME
$CO_2$
$C_2H_4$
$C_2H_6$
$N_2$
$CH_4$
CO
$C_3H_6$
$C_3H_8$
$C_3H_4$
S2
S1
S3

FIG.16

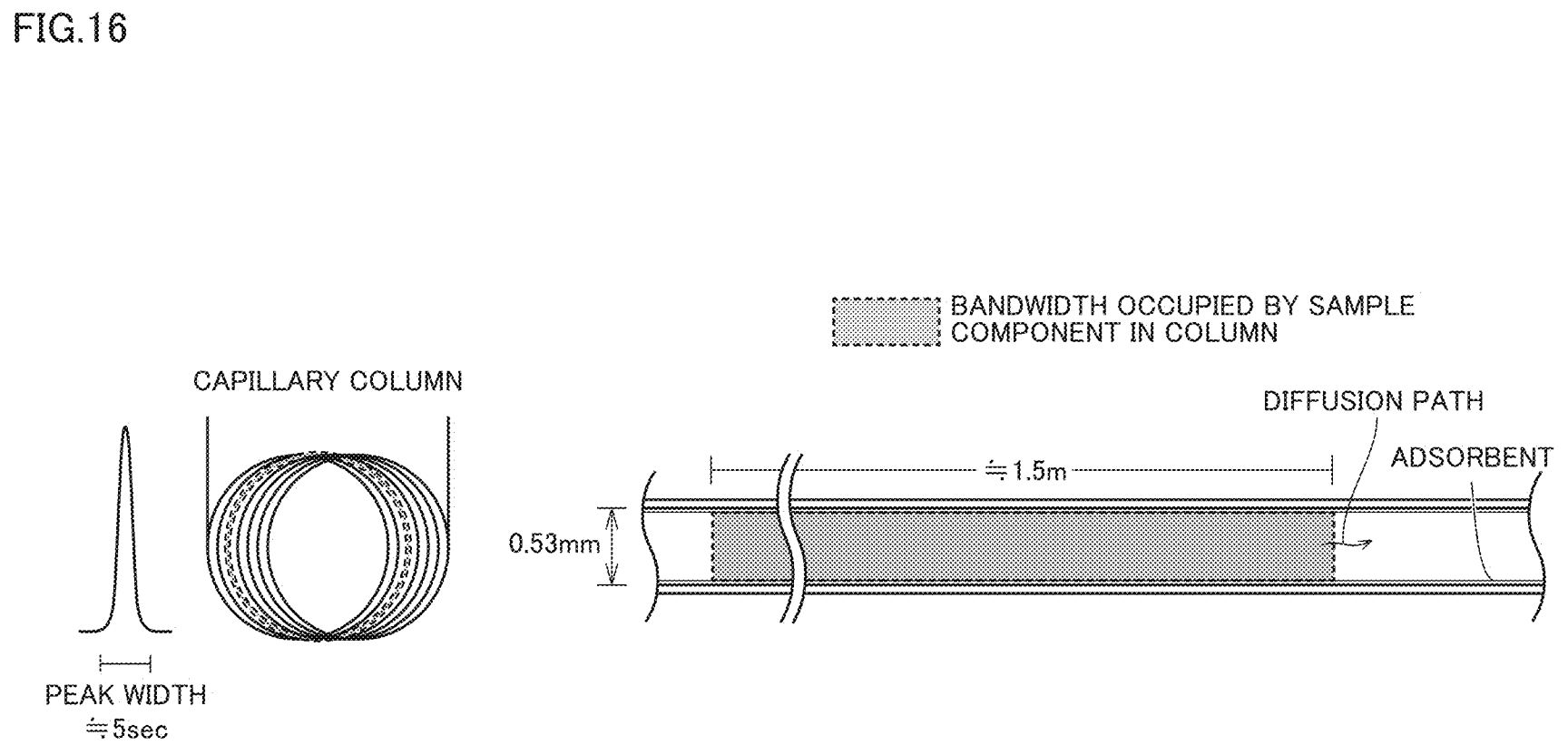

BANDWIDTH OCCUPIED BY SAMPLE COMPONENT IN COLUMN

DIFFUSION PATH

ADSORBENT

≒1.5m 0.53mm

CAPILLARY COLUMN

PEAK WIDTH ≒5sec

GAS ANALYSIS SYSTEM

CROSS REFERENCE TO RELATED APPLICATIONS

This nonprovisional application is based on Japanese Patent Application No. 2023-053039 filed with the Japan Patent Office on Mar. 29, 2023, the entire contents of which are hereby incorporated by reference.

BACKGROUND OF THE INVENTION

Field of the Invention

The present disclosure relates to a gas analysis system (gas chromatograph system) based on gas chromatography.

Description of the Background Art

Gas chromatography is an analysis technique to detect a component in gas by separation of the component in gas with the use of a separation column. Since components to be analyzed by gas chromatography are various, a huge number of types of columns have conventionally been developed.

For example, among conventional gas analysis systems, there is a gas analysis system configured to switch a pattern of connection between detectors that detect gas components and a plurality of separation columns, with the use of a multi-port switching valve (see Non Patent Literature 1).

Non Patent Literature 1: Agilent Technologies, Application "Refinery Gas (RGA) GC Analysis," 5989-7439 JAJP

SUMMARY OF THE INVENTION

In a gas analysis system, in consideration of reduction in cost and size and a degree of freedom in design, a common detector desirably detects gas components separated in a plurality of columns. In order to detect the gas components separated in the plurality of columns with the common detector, adjustment for introduction of the gas components separated in the plurality of columns into the detector at different timing is required. There is a demand for facilitation of this adjustment.

The present disclosure was made to solve the problem described above, and an object of the present disclosure is to provide a gas analysis system in which gas components separated in a plurality of columns can be detected with detector(s) smaller in number than the columns.

The gas analysis system according to the present disclosure includes a first column that separates a gas component contained in sample gas, a second column that separates a gas component contained in the sample gas, a detector that detects the gas components introduced from the first column and the second column, a valve that switches gas introduction from the first column into the detector, and a controller that performs delay processing of switching the valve between open and closed states so that timing of start of introduction of the gas component separated in the first column into the detector is delayed to be later than timing of completion of introduction of the gas component separated in the second column into the detector.

The foregoing and other objects, features, aspects and advantages of this invention will become more apparent from the following detailed description of this invention when taken in conjunction with the accompanying drawings.

BRIEF DESCRIPTION OF THE DRAWINGS

FIG. 6 is a diagram showing a state of the switching valves and a flow of each gas in a third operation pattern.

FIG. 16 is a diagram showing an exemplary diffusion image when a sample component is sealed in a capillary column.

DESCRIPTION OF THE PREFERRED EMBODIMENTS

Figure 1:
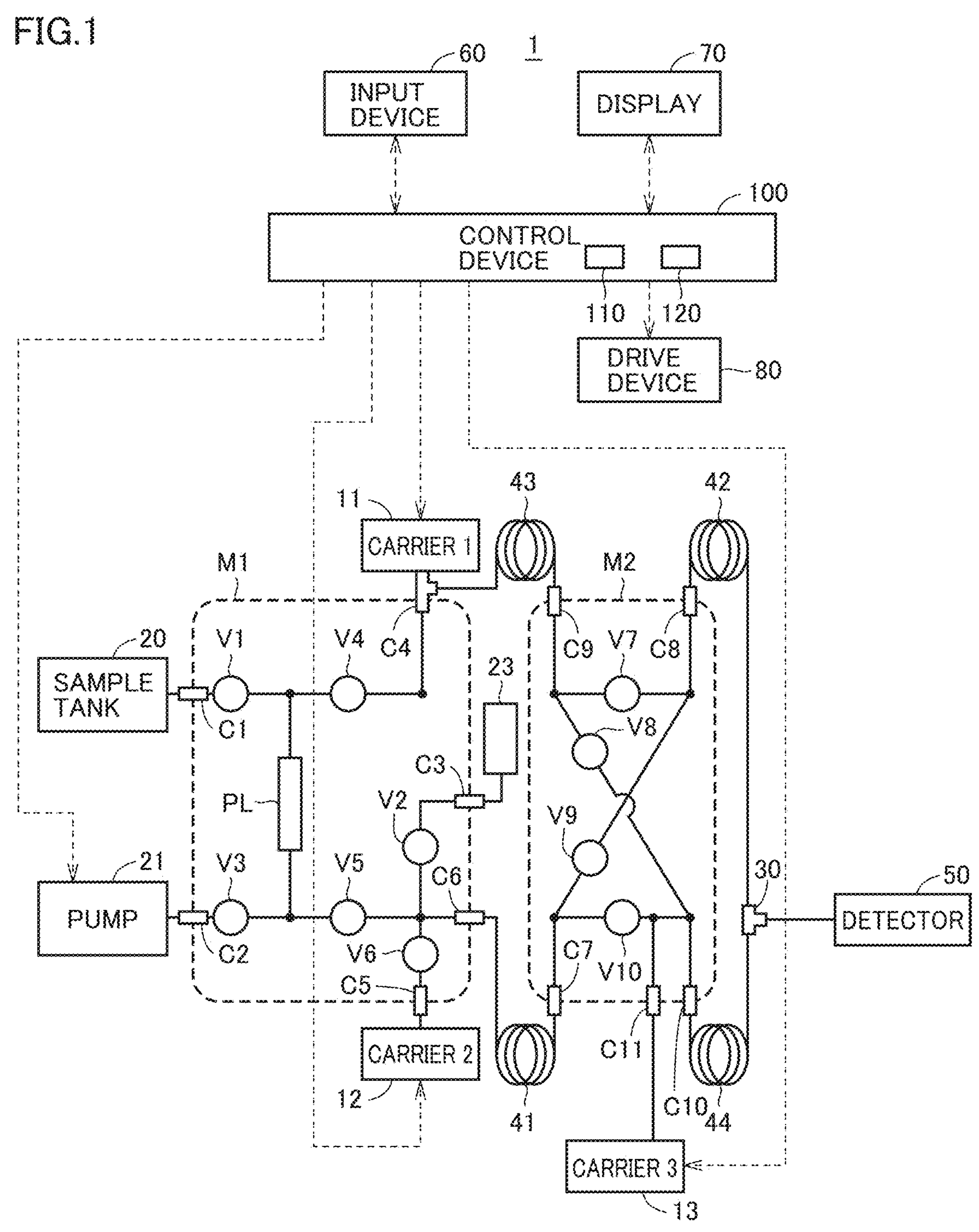
FIG. 1 is a diagram schematically showing an exemplary overall configuration of a gas analysis system.

The present embodiment will be described in detail below with reference to the drawings. The same or corresponding elements in the drawings below have the same reference characters allotted and description thereof will not be repeated.

[Overall Configuration of System]

FIG. 1 is a diagram schematically showing an exemplary overall configuration of a gas analysis system 1 according to the present embodiment.

Gas analysis system 1 includes carrier gas supply devices 11 to 13, a sample tank 20, a pump 21, a vent 23, a sampler module M1, a switching module M2, columns 41 to 44, a detector 50, an input device 60, a display 70, a drive device 80, and a controller 100.

Each of carrier gas supply devices 11 to 13 regulates a mobile phase called carrier gas to a predetermined pressure and outputs the mobile phase. For example, helium gas is used as carrier gas. The pressure of carrier gas is regulated by a not-shown electronic automatic pressure controller (APC).

Sample tank 20 is an apparatus where sample gas to be analyzed is stored. Sample tank 20 is connected to a connector C1 of sampler module M1. A user can change sample gas to be analyzed by gas analysis system 1 by replacing sample tank 20 connected to connector C1 of sampler module M1.

Pump 21 is a suction pump that suctions air in a flow channel in sampler module M1 to set a pressure in the flow channel in sampler module M1 to a negative pressure. The negative pressure here means a pressure lower than the atmospheric pressure, with the atmospheric pressure being defined as the reference.

Vent 23 allows communication of the flow channel in sampler module M1 to the outside to emit gas in the flow channel in sampler module M1 to the outside.

Sampler module M1 and switching module M2 are provided on a flow channel that is fluidly connected to sample tank 20, columns 41 to 44, and detector 50. Fluid connection here means direct connection by fluid without another component being interposed or indirect connection by fluid with another component being interposed.

Each of sampler module M1 and switching module M2 is formed by mount of a plurality of switching valves on a flow channel plate (flow channel member) where a flow channel pattern is formed.

Each of modules M1 and M2 is provided with a plurality of connectors (interfaces) for connection of an external device. A flow channel provided in each of modules M1 and M2 is connected to the external device through these connectors. Specifically, sampler module M1 is provided with connectors C1 to C6. Sample tank 20, pump 21, and vent 23 are connected to connectors C1 to C3, respectively. Carrier gas supply device 11 and column 43 are connected to connector C4. Carrier gas supply device 12 is connected to connector C5. Column 41 is connected to connector C6. Switching module M2 is provided with connectors C7 to C10. Columns 41 to 44 are connected to connectors C7 to C10, respectively.

Sampler module M1 is a device for dispensing a constant amount of sample gas to column 41. Sampler module M1 includes connectors C1 to C6, a sample loop PL of a constant volume, switching valves V1 to V6, and a plurality of flow channels that connect these members. Sample tank 20, pump 21, vent 23, carrier gas supply device 11, carrier gas supply device 12, and column 41 are connected to connectors C1 to C6 of sampler module M1, respectively, as described above.

Switching valves V1 and V4 are arranged in this order in the flow channel from connector C1 to connector C4. Switching valves V3, V5, and V6 are arranged in this order in the flow channel from connector C2 to connector C5. Switching valve V2 is arranged in the flow channel that connects the flow channel between switching valves V5 and V6 and connector C3 to each other.

Sample loop PL is arranged in the flow channel that connects the flow channel between switching valves V1 and V4 and the flow channel between switching valves V3 and V5 to each other. Sample loop PL performs a function to temporarily hold sample gas introduced from sample tank 20 for supply to column 41. As a connection target of sample loop PL is switched as appropriate by control of switching valves V1 to V6, sampler module M1 once allows sample loop PL to be filled with sample gas supplied from sample tank 20 and thereafter allows supply of sample gas filled in sample loop PL to column 41.

Switching module M2 includes connectors C7 to C10, switching valves V7 to V10, and a plurality of flow channels that connect these members. Columns 41 to 44 are connected to connectors C7 to C10 of switching module M2, respectively, as described above.

Switching valve V9 is arranged in the flow channel between connector C7 and connector C8. Switching valve V8 is arranged in the flow channel between connector C9 and connector C10.

Switching valve V7 is arranged in the flow channel that connects the flow channel between connector C9 and switching valve V8 and the flow channel between connector C8 and switching valve V9 to each other. Switching valve V10 is arranged in the flow channel that connects the flow channel between connector C7 and switching valve V9 and the flow channel between connector C10 and switching valve V8 to each other.

Switching valves V1 to V10 are switched to either an open state or a closed state by drive device 80. Drive device 80 switches the state of switching valves V1 to V10 in accordance with a command from controller 100. In other words, the state of switching valves V1 to V10 is controlled by controller 100.

Columns 43 and 44 are each a resistance tube for pressure regulation that is not capable of separating various components in sample gas.

Columns 41 and 42 each separate various components in supplied sample gas. Specifically, columns 41 and 42 each separate various components contained in sample gas in a temporal direction while supplied sample gas passes through each column over a flow of carrier gas and output the components. In the present embodiment, column 41 is a column for primary separation. Column 42 is a column for secondary separation for further separation of the various components in sample gas primarily separated in column 41.

Column 42 has an outlet connected to a merge portion 30. Column 41 has an outlet connected to merge portion 30 with switching module M2 and the resistance tube (column 44) being interposed. When switching valves V8 and V9 are opened and switching valves V7 and V10 are closed, switching module M2 is in a "serial state" (see FIG. 4 which will be described later) in which columns 41 and 42 are connected in series to merge portion 30 in this order. When switching valves V7 and V10 are opened and switching valves V8 and V9 are closed, on the other hand, switching module M2 is in a "parallel state" (see FIG. 9 which will be described later) in which columns 41 and 42 are connected in parallel to merge portion 30.

In the present embodiment, rather than a packed column (a column filled with an absorbent), a capillary column smaller in inner diameter than the packed column is adopted as columns 41 and 42.

Detector 50 is connected to merge portion 30 and detects various gas components introduced from merge portion 30. For example, an absorbance detector (photo diode array (PDA) detector), a fluorescence detector, a differential refractometer, a conductivity detector, or a mass spectrometer is employed as detector 50. Data indicating a result of detection by detector 50 is stored in a storage 120 in controller 100 and shown on display 70 in response to a request from a user. Input device 60 is implemented, for example, by a keyboard or a pointing device such as a mouse, and receives a request or a command from the user.

The request or the command from the user inputted to input device 60 is sent to controller 100.

Display 70 is implemented, for example, by a liquid crystal display (LCD) panel, and shows information to the user. When a touch panel is employed as a user interface, input device 60 and display 70 are integrally formed.

Controller 100 includes a processor 110, storage 120, an input and output interface, and the like. Controller 100 controls in an integrated manner, the entire gas analysis system 1 including carrier gas supply devices 11 to 13, pump 21, and switching valves V1 to V10 (drive device 80). Controller 100 is connected through a wire or wirelessly, to input device 60 and display 70 which are the user interfaces.

Processor 110 includes a computing unit (central processing unit), generates a control signal for control of switching valves V1 to V10 based on information stored in storage 120, and outputs the generated control signal to switching valves V1 to V10 (drive device 80) through the output interface.

[Construction of Switching Valves V1 to V10]

An exemplary construction of switching valves V1 to V10 according to the present embodiment will be described with reference to FIGS. 2 and 3. Since switching valves V1 to V10 are identical in basic construction, in FIGS. 2 and 3, switching valves V1 to V10 will be described as a microvalve 200, without being distinguished from one another.

Figure 2:
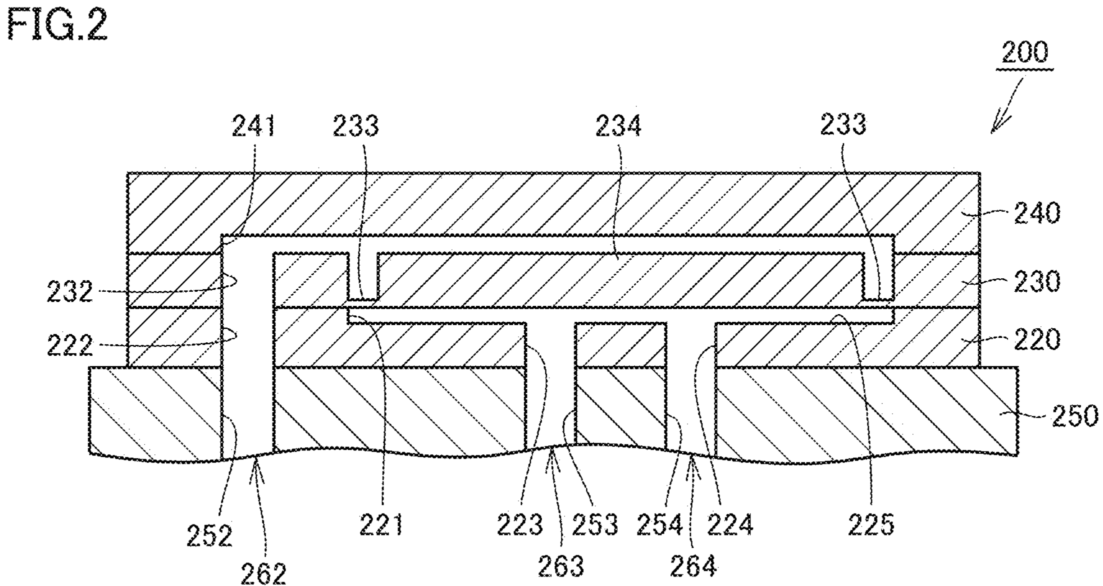
FIG. 2 is a cross-sectional view of a microvalve while the microvalve is open.

FIG. 2 is a cross-sectional view of microvalve 200 while microvalve 200 is open. FIG. 3 is a cross-sectional view of microvalve 200 while microvalve 200 is closed.

Microvalve 200 includes a base layer 220, a diaphragm layer 230, and a cover layer 240, and is in a layered structure in which these are layered in this order. Each of base layer 220, diaphragm layer 230, and cover layer 240 is formed, for example, of silicon to achieve desired strength and flexibility, and micromachined based on the micro electric mechanical systems (MEMS) technology.

Microvalve 200 has a thickness (a dimension in a direction of layering) approximately from 1 to 2 mm. Description may be given below, with a direction from base layer 220 toward cover layer 240 being defined as an upward direction and with a direction from cover layer 240 toward base layer 220 being defined as a downward direction, for the sake of convenience.

Base layer 220 is arranged as a lowermost layer of microvalve 200. Base layer 220 is provided with a recess 221 and openings 222 to 224 that pass through base layer 220. Recess 221 is in a substantially circular shape when base layer 220 is two-dimensionally viewed from above, and it is provided around substantially the center of base layer 220. Recess 221 is recessed from an upper surface side toward a lower surface side of base layer 220. Base layer 220 has a thickness of approximately 150 μm. Recess 221 has a depth from 5 to 20 μm, and preferably has a depth of approximately 10 μm.

Openings 223 and 224 are provided in a bottom 225 of recess 221. As will be described later, openings 223 and 224 define a flow inlet and a flow outlet of sample gas. Opening 222 is provided at a distance from recess 221, at an outer edge around recess 221 of base layer 220. Opening 222 defines a port of supply of fluid (pneumatic fluid) for control of microvalve 200.

Diaphragm layer 230 is arranged as being opposed to base layer 220 on the upper surface side of base layer 220. Diaphragm layer 230 includes an opening 232 that passes through diaphragm layer 230, a rigid portion 234, and a flexible portion 233 provided around rigid portion 234. Flexible portion 233 is smaller in thickness than rigid portion 234 and flexible. With elastic deformation of flexible portion 233, rigid portion 234 is displaced in an upward-downward direction.

Opening 232 is provided at a distance from flexible portion 233 and rigid portion 234. Opening 232 is provided at a position superimposed on opening 222 in base layer 220 when viewed two-dimensionally from above, and it defines, together with opening 222, the port of supply of pneumatic fluid.

Microvalve 200 is used as being connected to a flow channel member (flow channel plate) 250. Flow channel member 250 is provided with openings 252 to 254 at positions corresponding to respective openings 222 to 224 in base layer 220. Opening 252 in flow channel member 250, opening 222 in base layer 220, and opening 232 in diaphragm layer 230 communicate with one another to define a pneumatic fluid supply port 262. Pneumatic fluid is supplied to a recess 241 in cover layer 240 through supply port 262.

Opening 253 in flow channel member 250 communicates with opening 223 in base layer 220 to define a sample gas flow inlet 263. Opening 254 in flow channel member 250 communicates with opening 224 in base layer 220 to define a sample gas flow outlet 264.

Microvalve 200 is what is called a normally open valve which is open in an initial state (normal state) in which pneumatic fluid is not supplied to supply port 262 of flow channel member 250 and closed by supply of pneumatic fluid to supply port 262 of flow channel member 250.

While pneumatic fluid is not supplied to supply port 262 of flow channel member 250, as shown in FIG. 2, rigid portion 234 is held at a distance from bottom 225 of recess 221 in base layer 220. Therefore, an open state in which flow inlet 263 and flow outlet 264 of sample gas communicate with each other is set.

When pneumatic fluid is supplied to supply port 262 of flow channel member 250, rigid portion 234 is displaced downward by being pressed by pneumatic fluid. A lower surface of rigid portion 234 thus comes in intimate contact with bottom 225 of recess 221 in base layer 220 and a closed state in which sample gas flow inlet 263 and sample gas flow outlet 264 are disconnected from each other is set. Instead of drive (displacement) of rigid portion 234 with pneumatic fluid, rigid portion 234 may electrically be driven (displaced) by a piezoelectric element or the like.

[Operation Pattern of System]

Gas analysis system 1 detects gas components separated in columns 41 and 42 with a single detector 50 by switching an operation pattern in the order of first to eighth operation patterns below. An example in which inorganic gas ($N_2$, $O_2$, CO, $CO_2$, and the like) other than $H_2$ and He and some low hydrocarbon ($CH_4$, $C_2H_4$, $C_2H_6$, $C_3H_6$, $C_3H_8$, $C_3H_4$, and the like) are to be analyzed by gas analysis system 1 will mainly be described below.

(First Operation Pattern) Sample Introduction

Sample introduction is an operation pattern for sampling of a constant amount of sample gas.

Figure 4:
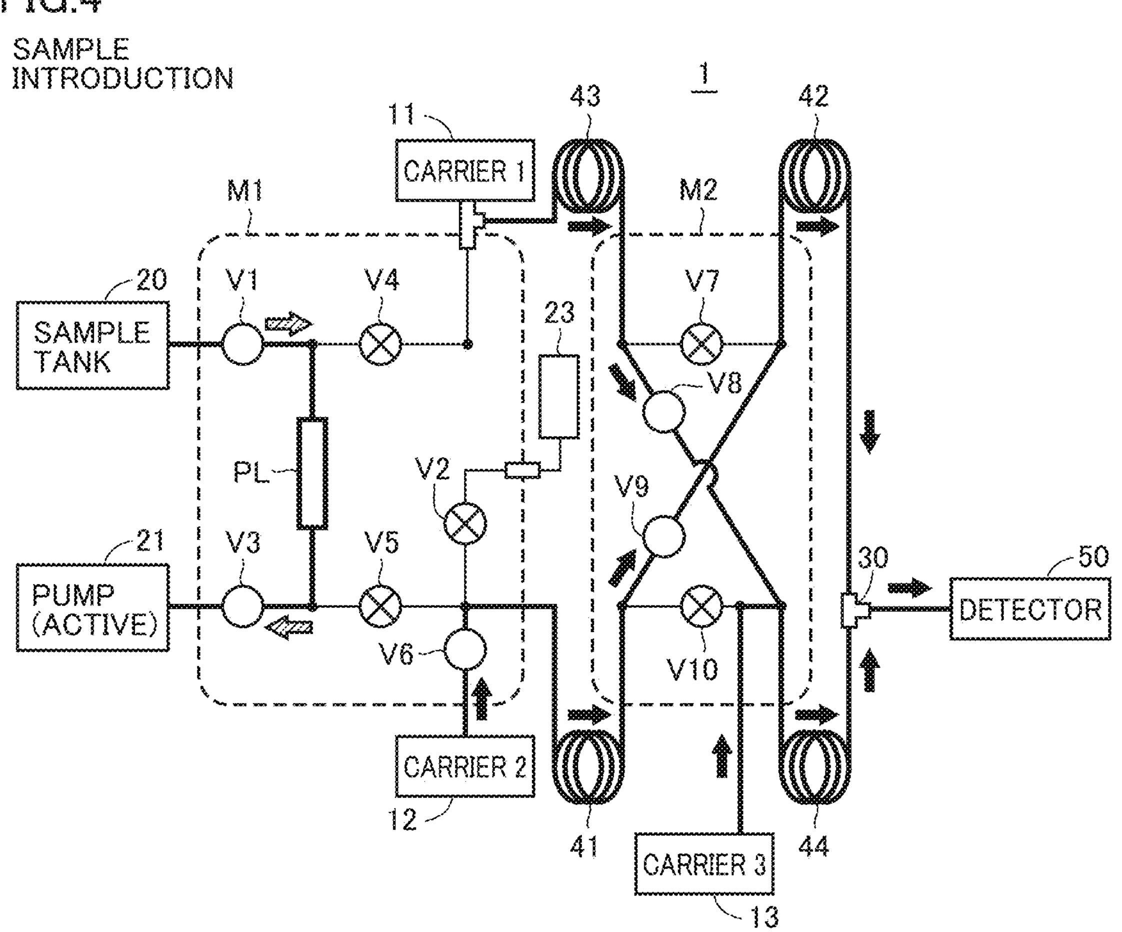
FIG. 4 is a diagram showing a state of switching valves and a flow of each gas in a first operation pattern.

FIG. 4 is a diagram showing a state of switching valves V1 to V10 and a flow of each gas in a first operation pattern (sample introduction). In FIG. 4, a switching valve labeled with a cross mark is closed and a switching valve not labeled with a cross mark is open. In FIG. 4, a solid arrow indicates a flow of carrier gas and a hatched arrow indicates a flow of sample gas (sample). This is also applicable to FIGS. 5 to 10 and 12 that follow.

As shown in FIG. 4, in the first operation pattern (sample introduction), controller 100 controls switching valves V1, V3, V6, V8, and V9 to open and controls other switching valves V2, V4, V5, V7, and V10 to close. Controller 100 activates pump 21. Thus, as shown with the hatched arrow, sample loop PL is filled with sample gas from sample tank 20.

Controller 100 activates carrier gas supply devices 11 to 13. Thus, as shown with the solid arrow, carrier gas from carrier gas supply device 11 is supplied to merge portion 30 through columns 43 and 44, carrier gas from carrier gas supply device 13 is supplied to merge portion 30 through column 44, and carrier gas from carrier gas supply device 12 is supplied to merge portion 30 through columns 41 and 42.

Thereafter, the operation pattern of gas analysis system 1 is switched to a next second operation pattern (pressure equilibrium).

(Second Operation Pattern) Pressure Equilibrium

Figure 5:
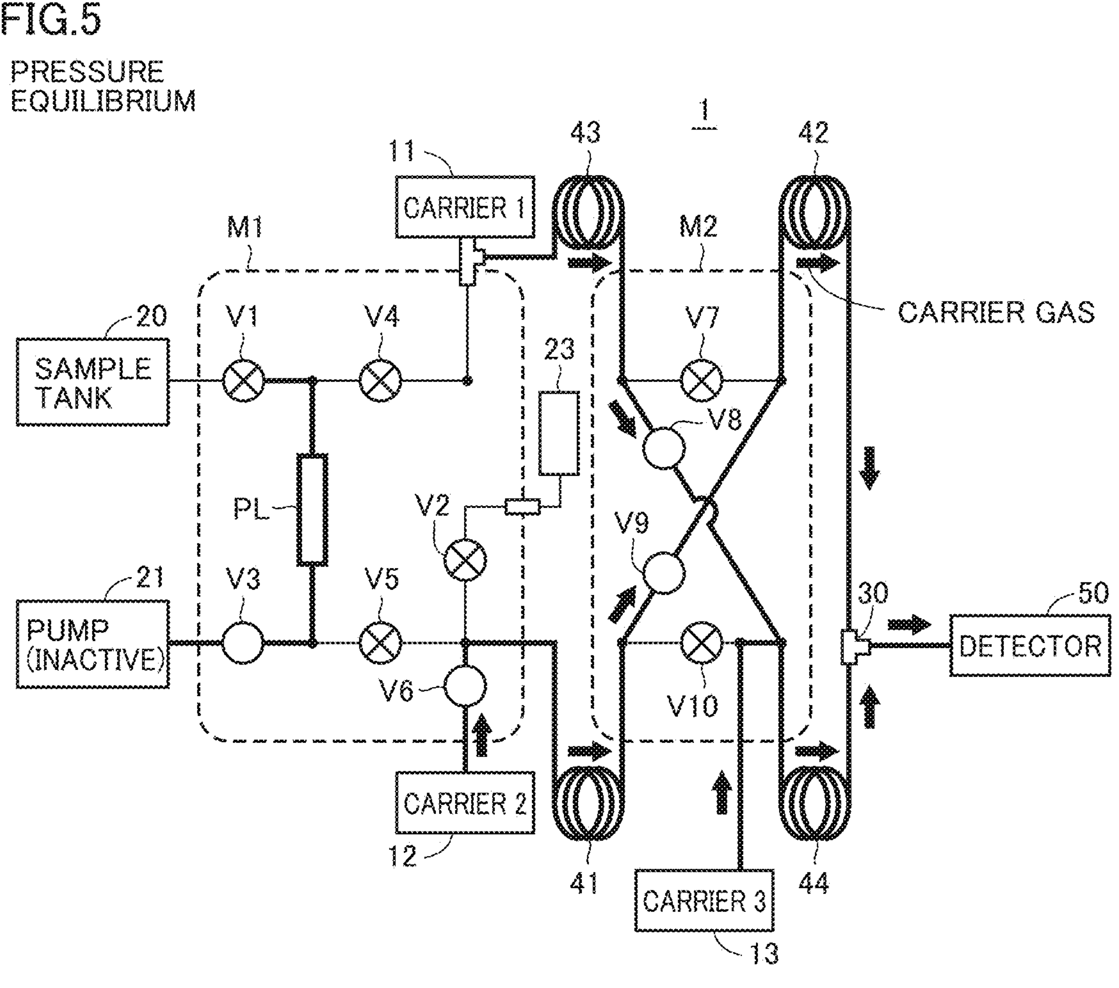
FIG. 5 is a diagram showing a state of the switching valves and a flow of each gas in a second operation pattern.

FIG. 5 is a diagram showing a state of switching valves V1 to V10 and a flow of each gas in the second operation pattern (pressure equilibrium). As shown in FIG. 5, in the second operation pattern (pressure equilibrium), controller 100 controls switching valves V3, V6, V8, and V9 to open and controls other switching valves V1, V2, V4, V5, V7, and V10 to close. Controller 100 activates carrier gas supply devices 11 to 13 and deactivates pump 21.

An equilibrium state in which the pressure in sample loop PL is stable substantially at the atmospheric pressure is thus set. An amount of sample gas held in sample loop PL can thus be stabilized at a constant amount.

Thereafter, the operation pattern of gas analysis system 1 is switched to a next third operation pattern (injection of sample gas).

(Third Operation Pattern) Injection of Sample Gas

FIG. 6 is a diagram showing a state of switching valves V1 to V10 and a flow of each gas in the third operation pattern (injection of sample gas). As shown in FIG. 6, in the third operation pattern (injection of sample gas), controller 100 controls switching valves V4, V5, V8, and V9 to open and controls other switching valves V1 to V3, V6, V7, and V10 to close. Controller 100 activates carrier gas supply devices 11 and 13 and deactivates carrier gas supply device 12 and pump 21.

Carrier gas from carrier gas supply device 11 is thus supplied to sample loop PL through switching valve V4 and sample gas filled in sample loop PL is pushed out by carrier gas and supplied to column 41 through switching valve V5.

Thereafter, the operation pattern of gas analysis system 1 is switched to a next fourth operation pattern (primary separation).

(Fourth Operation Pattern) Primary Separation

Figure 7:
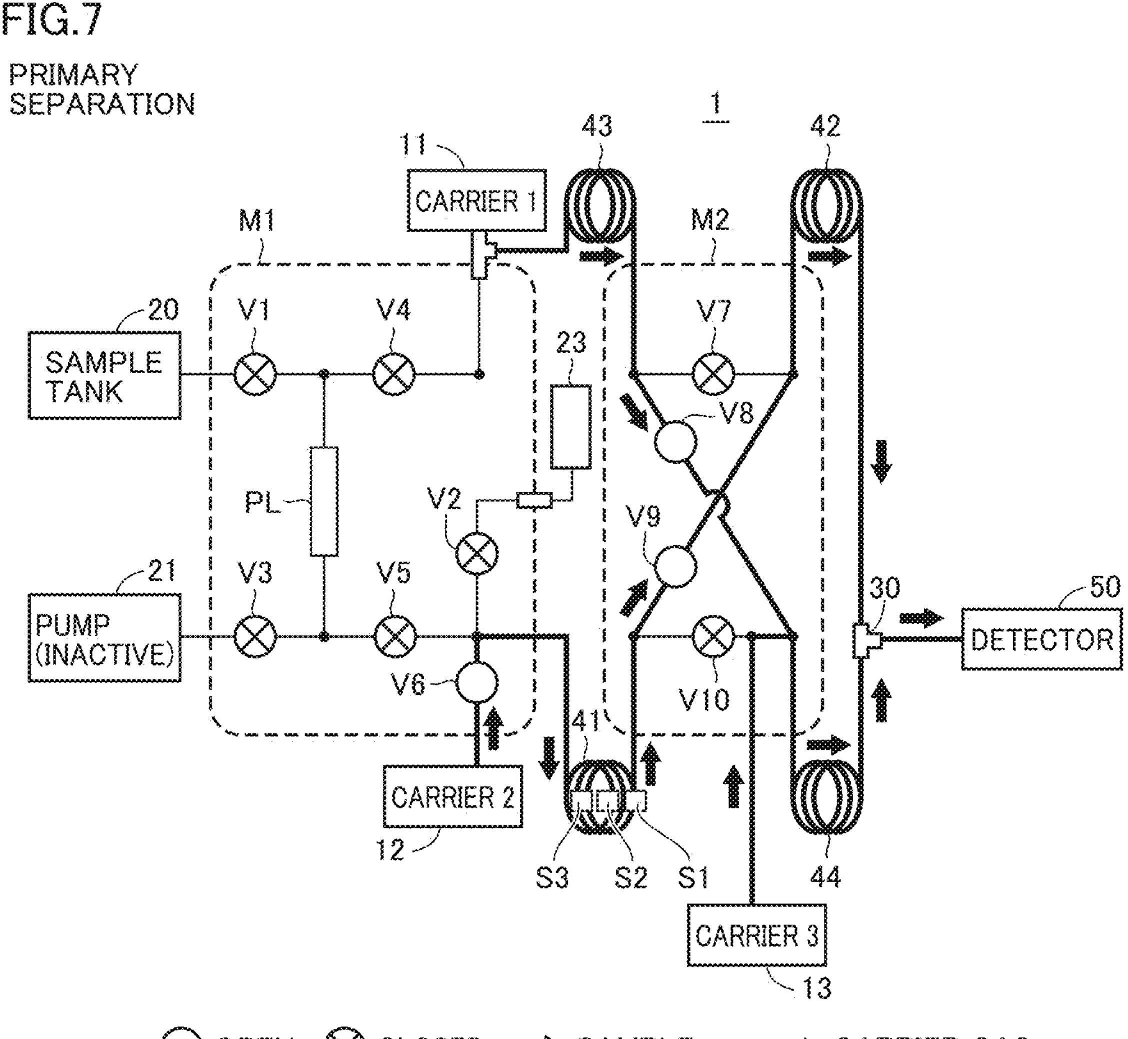
FIG. 7 is a diagram showing a state of the switching valves and a flow of each gas in a fourth operation pattern.

FIG. 7 is a diagram showing a state of switching valves V1 to V10 and a flow of each gas in the fourth operation pattern (primary separation). As shown in FIG. 7, in the fourth operation pattern (primary separation), controller 100 controls switching valves V6, V8, and V9 to open and controls other switching valves V1 to V5, V7, and V10 to close. Controller 100 activates carrier gas supply devices 11 to 13 and deactivates pump 21.

Thus, in column 41, sample gas is primarily separated. FIG. 7 shows an example in which sample gas supplied to column 41 is separated into a component (component group) S1 that is eluted early, a component (component group) S2 that is eluted later than component S1, and a component (component group) S3 that is eluted later than component S2, by primary separation in column 41. The present embodiment is configured such that, of components to be analyzed ($N_2$, $O_2$, CO, $CO_2$, $CH_4$, $C_2H_4$, $C_2H_6$, $C_3H_6$, $C_3H_8$, and $C_3H_4$) contained in sample gas, $N_2$, $O_2$, CO, and $CH_4$ are included in component S1, $CO_2$, $C_2H_4$, and $C_2H_6$ are included in component S2, and $C_3H_6$, $C_3H_8$, and $C_3H_4$ are included in component S3.

Thereafter, the operation pattern of gas analysis system 1 is switched to a next fifth operation pattern (secondary separation).

(Fifth Operation Pattern) Secondary Separation

Figure 8:
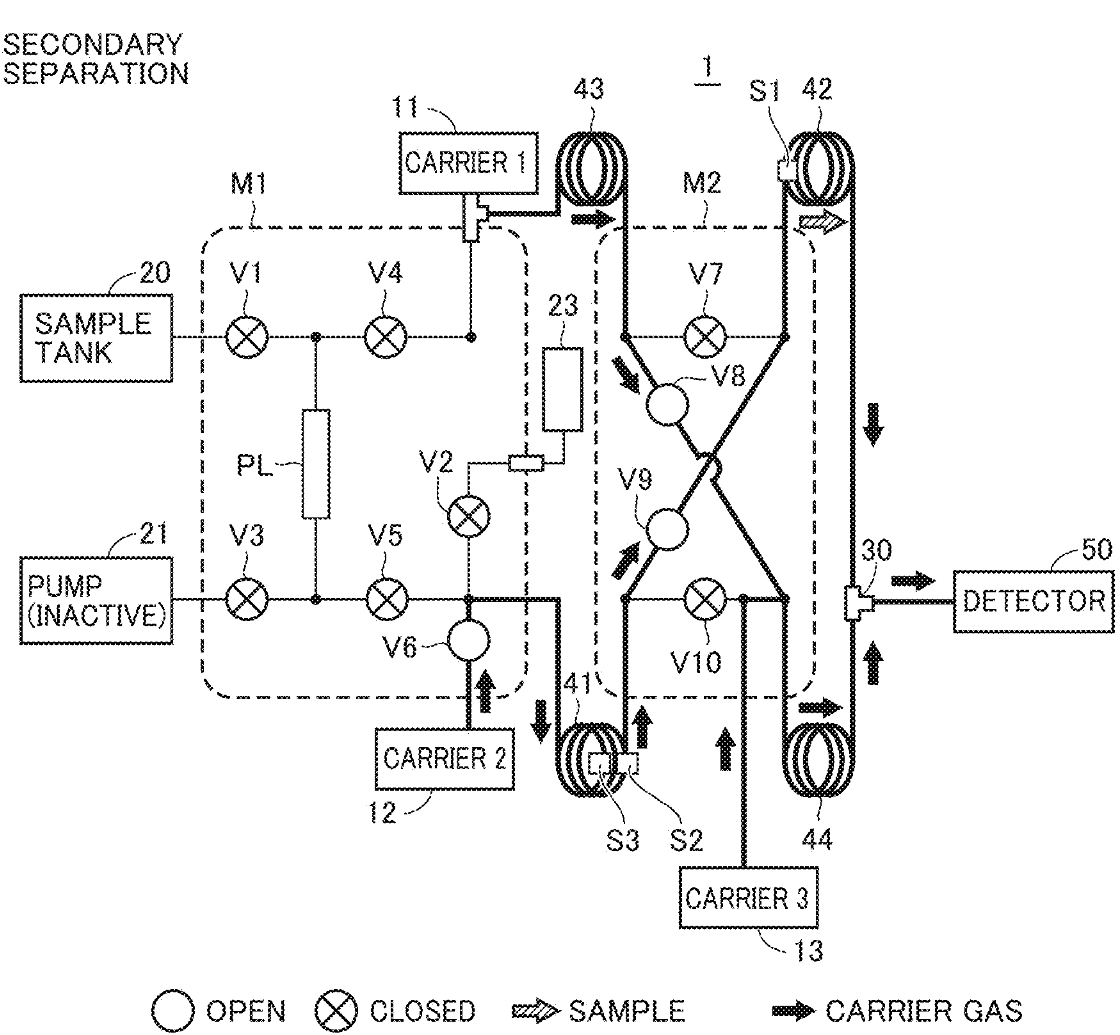
FIG. 8 is a diagram showing a state of the switching valves and a flow of each gas in a fifth operation pattern.

FIG. 8 is a diagram showing a state of switching valves V1 to V10 and a flow of each gas in the fifth operation pattern (secondary separation). As shown in FIG. 8, in the fifth operation pattern (secondary separation), the state in the fourth operation pattern (primary separation) is kept. Specifically, in the fifth operation pattern (secondary separation), controller 100 controls switching valves V6, V8, and V9 to open and controls other switching valves V1 to V5, V7, and V10 to close. Controller 100 activates carrier gas supply devices 11 to 13 and deactivates pump 21.

Thus, component S1 that is eluted early among components S1 to S3 primarily separated in column 41 is supplied to column 42 and secondarily separated in column 42.

Thereafter, the operation pattern of gas analysis system 1 is switched to a next sixth operation pattern (detection of S2).

(Sixth Operation Pattern) Detection of S2

In the first to fifth operation patterns described above, switching module M2 is controlled to be in the serial state (the state in which columns 41 and 42 are connected in series to merge portion 30) described above.

In contrast, in the sixth operation pattern (detection of S2), in order to detect component S2 separated in column 41 earlier than component S1 secondarily separated in column 42, switching module M2 is switched to the parallel state (the state in which columns 41 and 42 are connected in parallel to merge portion 30) described above.

Figure 9:
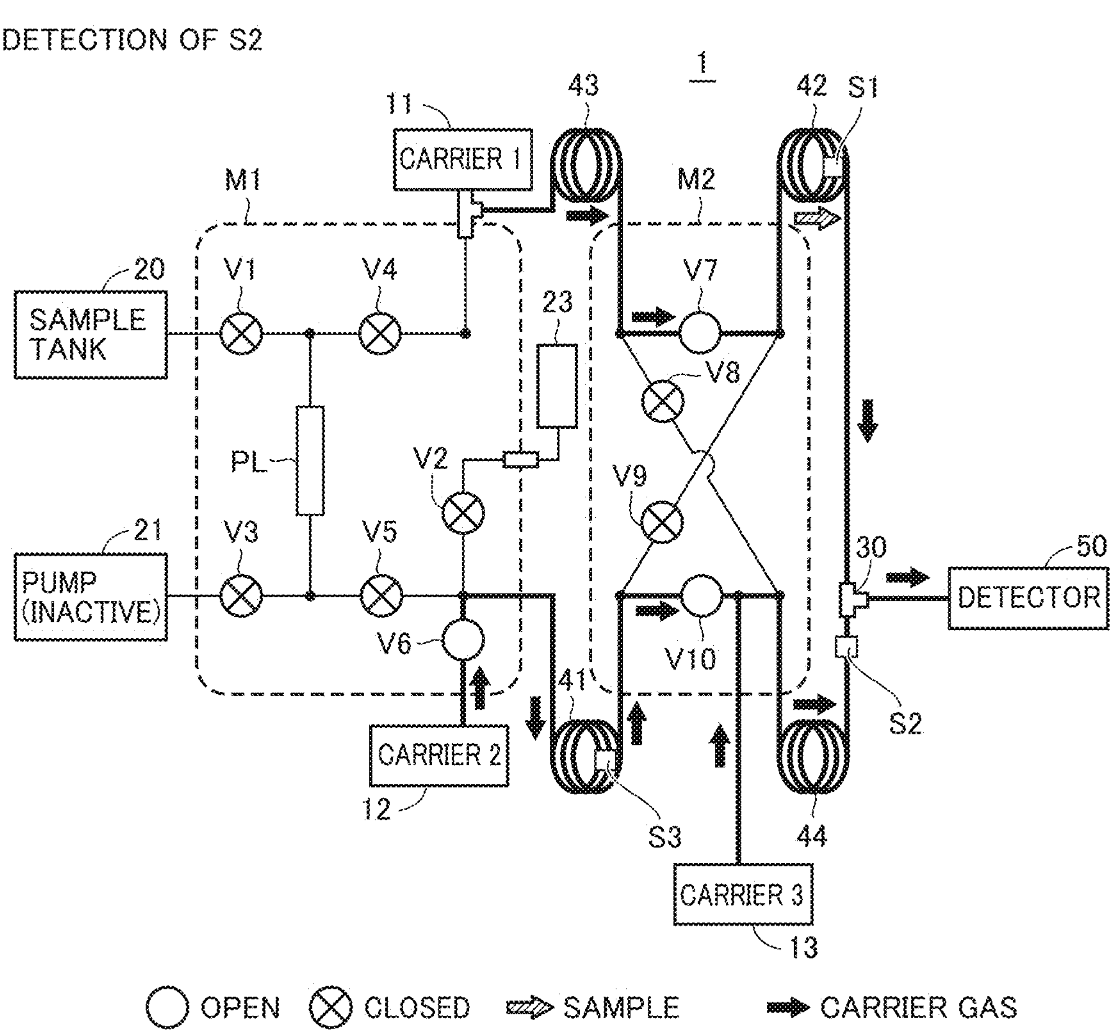
FIG. 9 is a diagram showing a state of the switching valves and a flow of each gas in a sixth operation pattern.

FIG. 9 is a diagram showing a state of switching valves V1 to V10 and a flow of each gas in the sixth operation pattern (detection of S2). As shown in FIG. 9, in the sixth operation pattern (detection of S2), controller 100 controls switching valves V6, V7, and V10 to open and controls other switching valves V1 to V5, V8, and V9 to close. Controller 10 activates carrier gas supply devices 11 to 13 and deactivates pump 21.

Switching module M2 is thus in the parallel state described above, so that component S2 eluted from column 41 is introduced into detector 50 through merge portion 30 before component S1 is eluted from column 42. Component S2 is thus detected before component S1.

Thereafter, the operation pattern of gas analysis system 1 is switched to a next seventh operation pattern (detection of S1).

(Seventh Operation Pattern) Detection of S1

In the seventh operation pattern (detection of S1), in order to detect component S1, component S1 eluted from column 42 is introduced into detector 50.

At this time, if switching module M2 is maintained in the parallel state, simultaneously with introduction of component S1 from column 42 into detector 50, component S3 is also introduced from column 41 into detector 50 and such an inconvenience as overlap of a peak of component S1 and a peak of component S3 on each other may be caused.

In order to avoid such overlap of the peaks, in the seventh operation pattern (detection of S1), "delay processing" for delaying timing of start of introduction of component S3 from column 41 into detector 50 to be later than timing of completion of introduction of component S1 from column 42 into detector 50 is performed. The delay processing may be performed based on a predetermined delay time period.

Specifically, in the delay processing, controller 100 controls switching valve V10 provided on an outlet side of column 41 to close for the delay time period to temporarily enclose component S3 in column 41. In the present embodiment, column 41 corresponds to an exemplary "first column" in the present disclosure and column 42 corresponds to an exemplary "second column" in the present disclosure.

The delay processing may be performed by detection of timing of completion of introduction of component S1 from column 42 into detector 50. The timing may be detected, for example, by analysis of a chromatogram.

Figure 10:
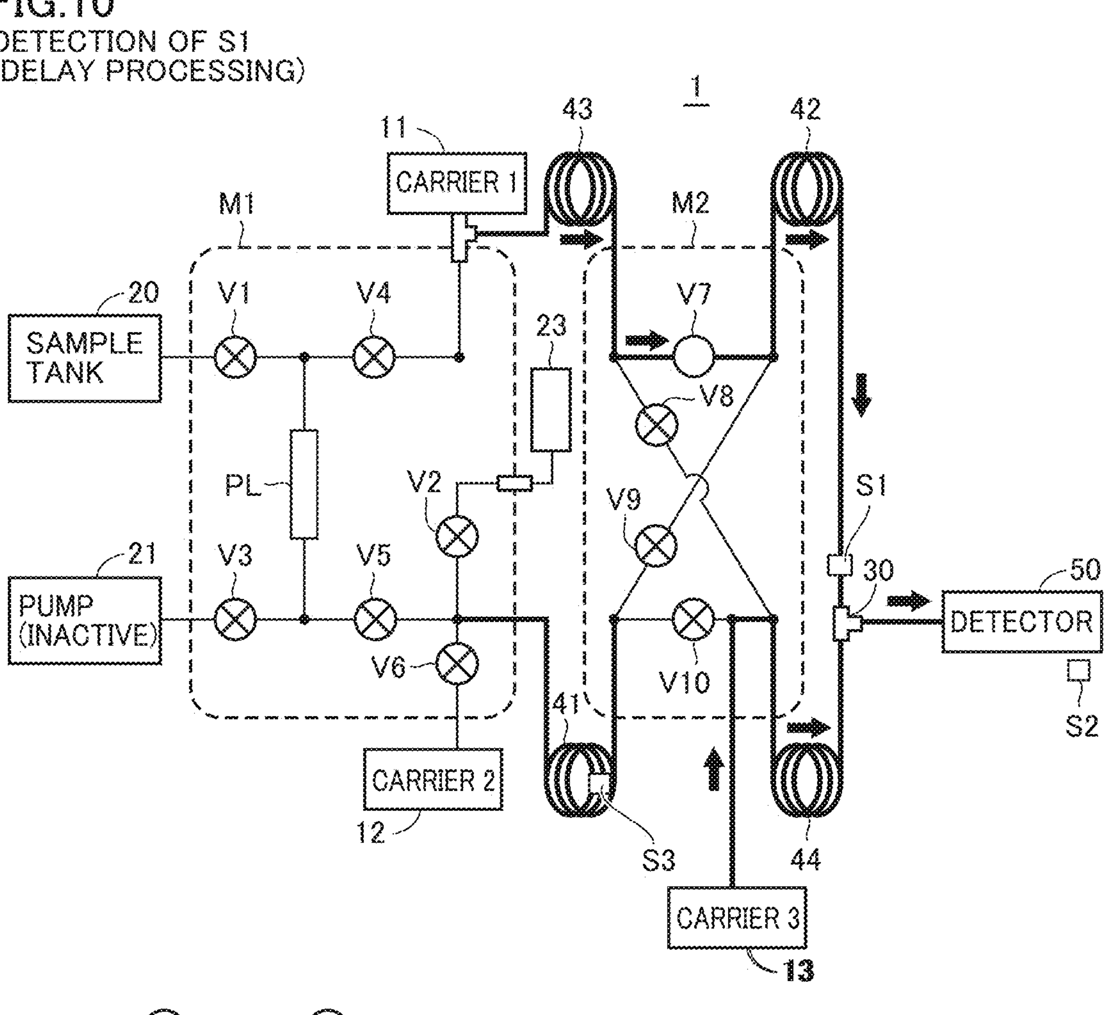
FIG. 10 is a diagram showing a state of the switching valves and a flow of each gas in a seventh operation pattern.

FIG. 10 is a diagram showing a state of switching valves V1 to V10 and a flow of each gas in the seventh operation pattern (detection of S1). As shown in FIG. 10, in the seventh operation pattern (detection of S1), controller 100 controls switching valve V7 to open and controls other switching valves V1 to V6 and V8 to V10 to close. Controller 100 activates carrier gas supply devices 11 and 13 and deactivates carrier gas supply device 12 and pump 21.

Component S1 eluted from column 42 is thus introduced into detector 50 through merge portion 30 and detected. Furthermore, until completion of introduction of component S1 into detector 50, component S3 is enclosed in column 41.

Figure 11:
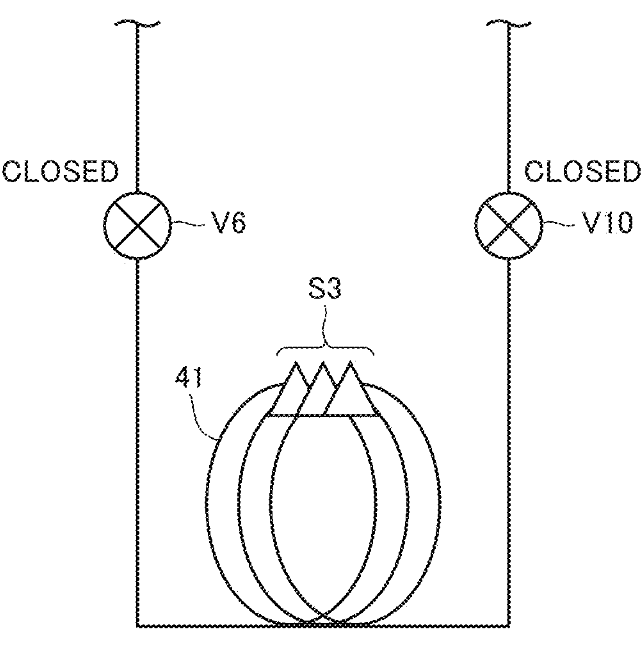
FIG. 11 is a diagram schematically showing a state of a component S3 during delay processing.

FIG. 11 is a diagram schematically showing a state of component S3 during the delay processing. As shown in FIG. 11, during the delay processing, switching valve V10 provided on the outlet side of column 41 is closed so that the mobile phase (carrier gas) and component S3 ($C_3H_6$, $C_3H_8$, and $C_3H_4$) are temporarily enclosed in column 41 while they are at a standstill. Timing of elution of component S3 from column 41 can thus be delayed.

Though not only switching valve V10 on the outlet side of column 41 but also switching valve V6 on an inlet side is closed during the delay processing, switching valve V6 on the inlet side may be open during the delay processing. Though carrier gas supply device 12 is inactive during the delay processing in the present embodiment, carrier gas supply device 12 may be active during the delay processing. During the delay processing, even if carrier gas supply device 12 is active and switching valve V6 on the inlet side is open, switching valve V10 on the outlet side is closed so that the mobile phase and component S3 can temporarily be enclosed in column 41.

Thereafter, the operation pattern of gas analysis system 1 is switched to a next eighth operation pattern (detection of S3).

(Eighth Operation Pattern) Detection of S3

In the eighth operation pattern (detection of S3), in order to detect component S3, the delay processing described above is canceled to allow introduction of component S3 into detector 50.

Figure 12:
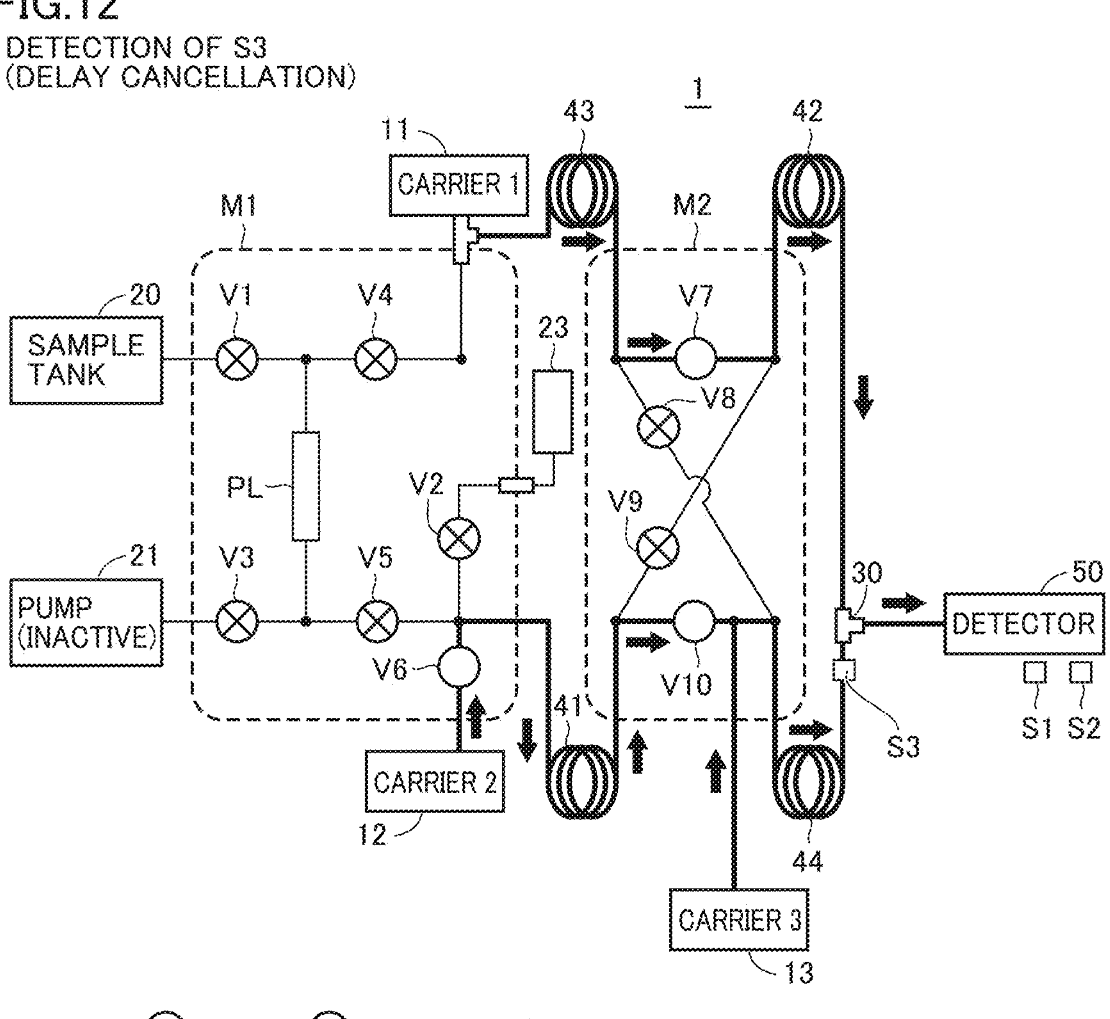
FIG. 12 is a diagram showing a state of the switching valves and a flow of each gas in an eighth operation pattern.
Figure 12:

FIG. 12 is a diagram showing a state of switching valves V1 to V10 and a flow of each gas in the eighth operation pattern (detection of S3). As shown in FIG. 12, in the eighth operation pattern (detection of S3), controller 100 controls switching valves V6, V7, and V10 to open and controls other switching valves V1 to V5, V8, and V9 to close. Controller 100 activates carrier gas supply devices 11 to 13 and deactivates pump 21.

The delay processing described above is thus canceled and component S3 separated in column 41 is introduced into detector 50 through merge portion 30 and detected.

Figure 13:
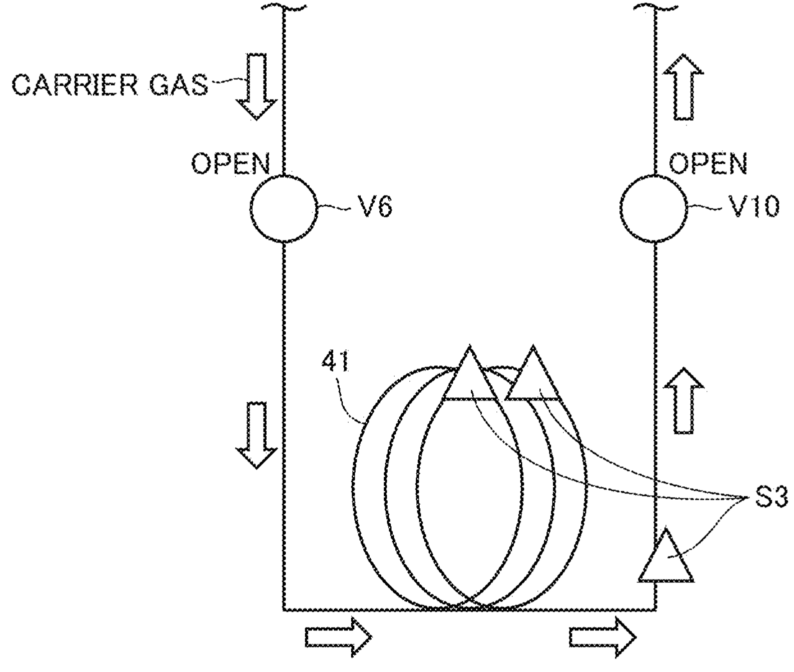
FIG. 13 is a diagram schematically showing a state of component S3 after the delay processing is canceled.

FIG. 13 is a diagram schematically showing a state of component S3 after the delay processing is canceled. As shown in FIG. 13, after the delay processing is canceled, switching valve V6 on the inlet side of column 41 and switching valve V10 on the outlet side are opened to allow supply of carrier gas from carrier gas supply device 12 to column 41. Component S3 ($C_3H_6$, $C_3H_8$, and $C_3H_4$) separated in column 41 is thus pushed out by carrier gas and introduced into detector 50.

Figure 14:
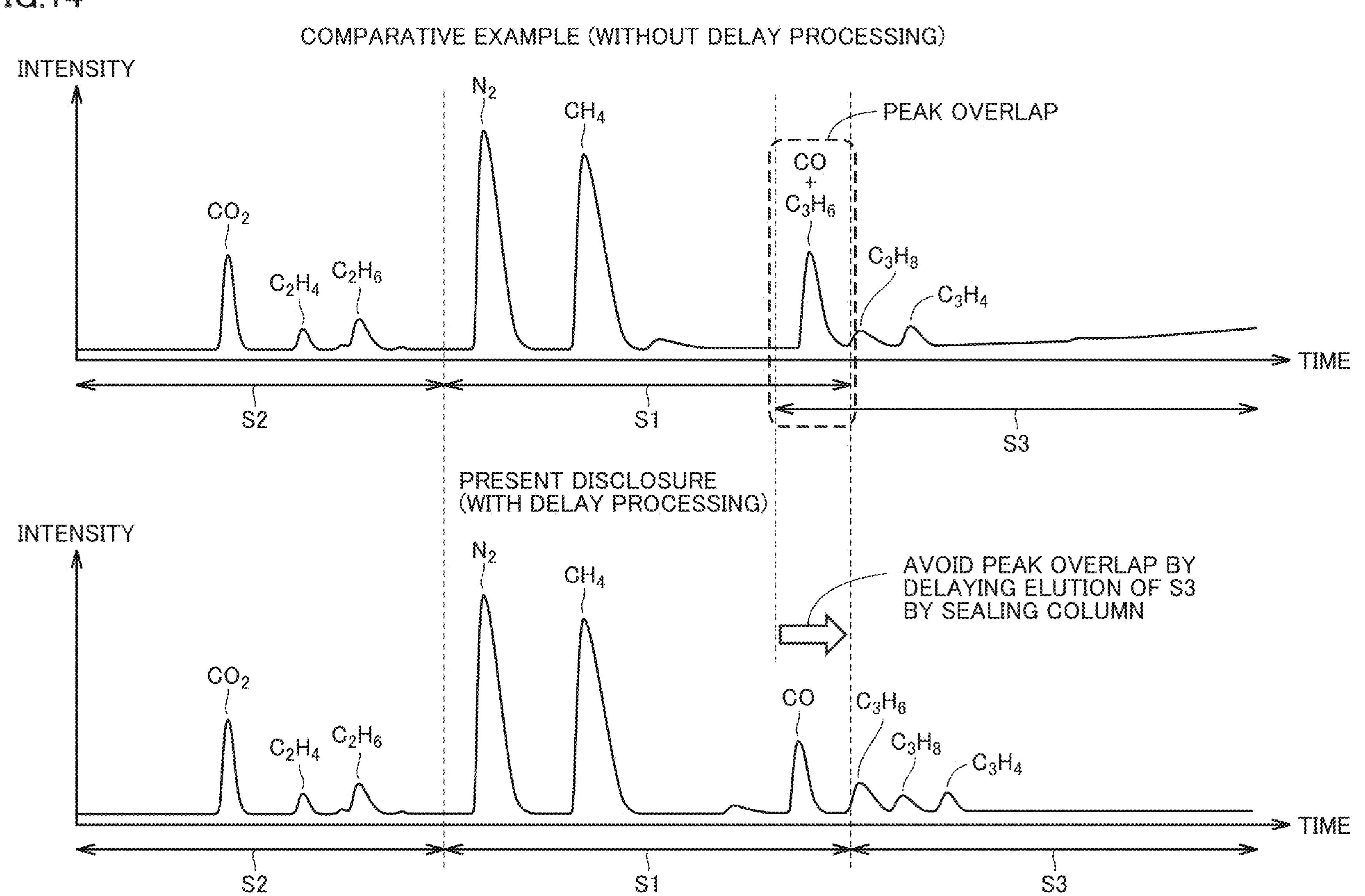
FIG. 14 is a diagram showing an exemplary result of analysis by the gas analysis system.

FIG. 14 is a diagram showing an exemplary result of analysis by gas analysis system 1 according to the present embodiment. FIG. 14 shows a result of analysis in an example where sample gas contains $N_2$, CO, $CO_2$, $CH_4$, $C_2H_4$, $C_2H_6$, $C_3H_6$, $C_3H_8$, and $C_3H_4$.

FIG. 14 shows in an upper tier, as a result of analysis in a comparative example as compared with the present disclosure, a result of analysis when the delay processing (processing for temporarily enclosing component S3 in column 41) described above is not performed. FIG. 14 shows in a lower tier, as a result of analysis according to the present disclosure, a result of analysis when the delay processing described above is performed.

In gas analysis system 1 according to the present embodiment, as described above, components S2 and S3 eluted from column 41 and component S1 eluted from column 42 are introduced into detector 50 in the order of components S2, S1, and S3. Component S1 includes $N_2$, $CH_4$, and CO, component S2 includes $CO_2$, $C_2H_4$, and $C_2H_6$, and component S3 includes $C_3H_6$, $C_3H_8$, and $C_3H_4$.

In the comparative example in which the delay processing described above is not performed, as shown in the upper tier in FIG. 14, a peak of CO eluted last in component S1 ($N_2$, $CH_4$, and CO) separated in column 42 overlaps with a peak of $C_3H_6$ eluted first in component S3 ($C_3H_6$, $C_3H_8$, and $C_3H_4$) separated in column 41.

In contrast, in the present disclosure, by delaying timing of elution of component S3 through the delay processing described above, overlap of the peaks described above is avoided as shown in the lower tier in FIG. 14.

In the comparative example (corresponding to a conventional example) in which the delay processing is not performed, in order to avoid overlap of the peaks as described above, bothersome adjustment works by a skilled worker for a long period of time has been required. For example, time of elution can be adjusted to desired time by fine adjustment of an amount of a filler in the inside in the case of the packed column and by fine adjustment of a length of the column by cutting or replacement in the case of the capillary column. For the column of each type, however, adjustment of a temperature and a pressure has been required and adjustment works should be repeated while the time of elution is checked each time, which is very bothersome. In particular, in the case of the packed column, a piping structure is very complicated, and even a skilled worker requires very long time for disassembly and assembly of pipes. Therefore, enormous time and cost have been required for adjustment works.

In contrast, in the present disclosure, timing of elution of component S3 can be delayed by such simplified processing as closing of switching valve V10 between column 41 and merge portion 30, without the need for modification of hardware. Overlap of the peaks described above can thus readily be avoided without bothersome adjustment works by a skilled worker.

Figure 3:
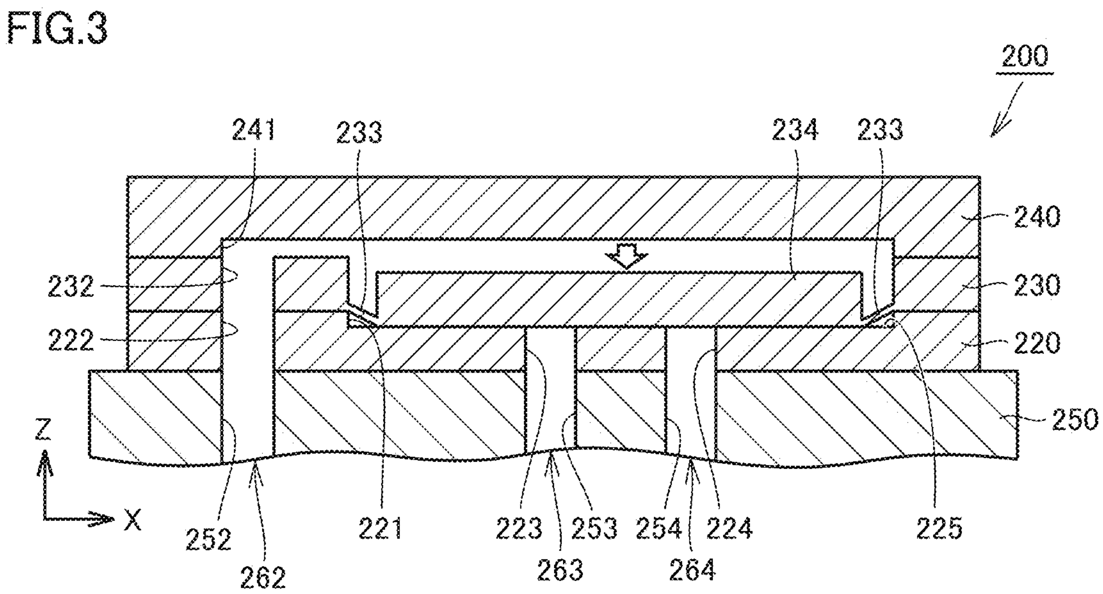
FIG. 3 is a cross-sectional view of the microvalve while the microvalve is closed.

Furthermore, in the present embodiment, switching valve V10 is implemented by microvalve 200 structured as shown in FIGS. 2 and 3 described above. A dead volume in switching valve V10 can thus be very small. An extent of diffusion of component S3 in column 41 in a direction of a column length when switching valve V10 is closed can thus be made smaller.

Specifically, if switching valve V10 is implemented by a multi-port switching valve large in dead volume, due to the large dead volume in switching valve V10, component S3 in column 41 tends to diffuse in the direction of the column length in column 41 even when carrier gas in column 41 is brought to a standstill by closing of switching valve V10. Consequently, there is a concern about increase in bandwidth of the peak due to diffusion. In the present embodiment, however, switching valve V10 is implemented by a microvalve very small in dead volume, so that the extent of diffusion of component S3 in column 41 in the direction of the column length when switching valve V10 is closed can be made smaller. Increase in bandwidth of the peak due to diffusion can thus be suppressed.

In addition, in the present embodiment, column 41 is implemented by the capillary column smaller in inner diameter than the packed column. Therefore, increase in bandwidth of the peak due to diffusion can more appropriately be suppressed than in an example where column 41 is implemented by the packed column.

Specifically, the packed column is relatively large in inner diameter, and the column inner diameter is large relative to the bandwidth occupied by the gas component in the column. Therefore, diffusion has a large impact on increase in bandwidth of the peak.

Figure 15:
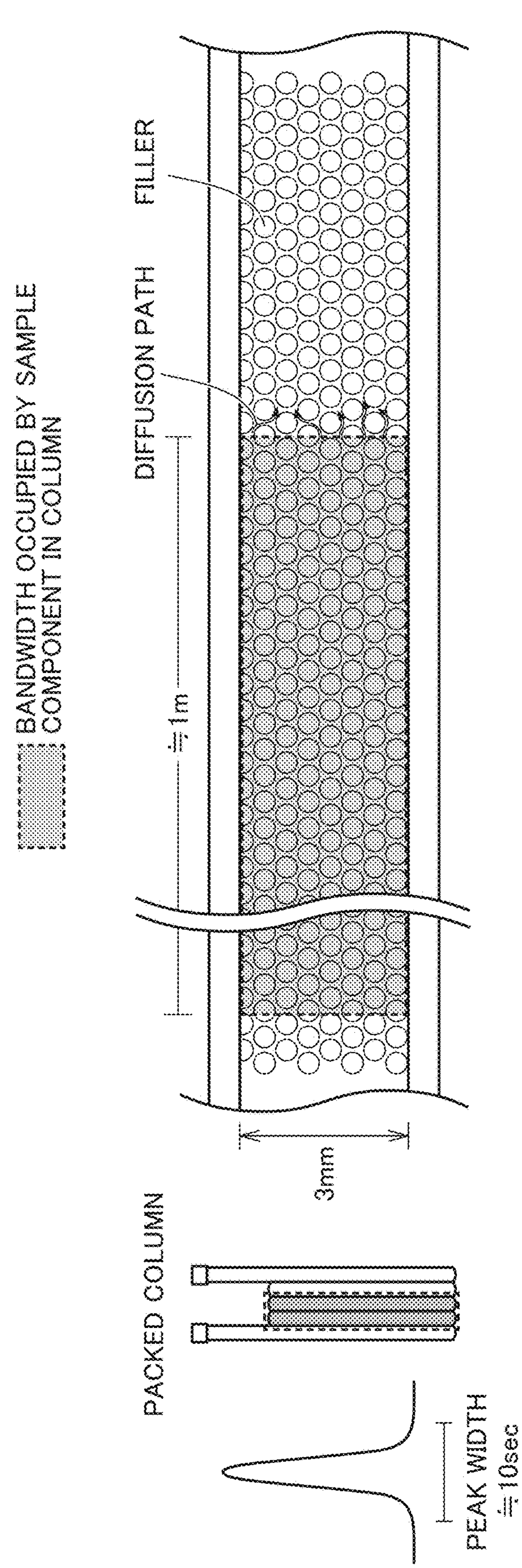
FIG. 15 is a diagram showing an exemplary diffusion image when a sample component is sealed in a packed column.

FIG. 15 is a diagram showing an exemplary diffusion image when a sample component is sealed in the packed column. In the example shown in FIG. 15, the column inner diameter is 3 mm, which is large with respect to approximately 1 m which is the bandwidth occupied by the sample component in the column. Furthermore, in the packed column, the sample component is dispersed through a large number of channels defined by gaps among fillers in the inside. Therefore, the extent of diffusion of the sample component tends to be large.

In contrast, the capillary column is relatively small in inner diameter, and the column inner diameter is very small relative to the bandwidth occupied by the sample component in the column. Therefore, diffusion has a very small impact on increase in bandwidth of the peak.

FIG. 16 is a diagram showing an exemplary diffusion image when a sample component is sealed in the capillary column. In the example shown in FIG. 16, the column inner diameter is 0.53 mm, which is very small with respect to approximately 1.5 m which is the bandwidth occupied by the sample component in the column. Therefore, since an amount of increase in width of the peak due to diffusion is much smaller than the entire bandwidth occupied by the sample component and is ignorable, separation performance can be maintained, without a shape of the peak being deteriorated by diffusion.

Therefore, by employing the capillary column rather than the packed column for column 41, increase in bandwidth of the peak due to diffusion can more appropriately be suppressed, which is shown also in a waveform in FIG. 14. Specifically, based on comparison shown in FIG. 14 between waveforms of $C_3H_8$ and $C_3H_4$ in the comparative example in which the delay processing is not performed and waveforms of $C_3H_8$ and $C_3H_4$ in the present disclosure in which the delay processing is performed, an area and a shape of the peak of both of them are not varied and substantially the same, which shows that there is no increase in peak width due to diffusion of component S3 in column 41 at the time of enclosure of component S3 in column 41 in the delay processing or sample loss due to switching of the flow channel. As set forth above, according to gas analysis system 1 according to the present embodiment, the gas component separated in column 41 and the gas component separated in column 42 are introduced into common detector 50 through merge portion 30. Therefore, the number of detectors can be smaller than in an example in which the gas component separated in column 41 and the gas component separated in column 42 are introduced into detectors different from each other.

Furthermore, in gas analysis system 1 according to the present embodiment, switching valve V10 is arranged between column 41 and merge portion 30 and controller 100 performs the "delay processing" described above which is simplified processing of switching this switching valve V10 between the open and closed states, so that timing of start of introduction of the gas component separated in column 41 into detector 50 can be delayed to be later than timing of completion of introduction of the gas component separated in column 42 into detector 50. Coincidence between timing of detection of the gas component separated in column 42 and timing of detection of the gas component separated in column 41 can thus readily be avoided without bothersome adjustment works by a skilled worker.

<Modification of System Configuration>

Gas analysis system 1 according to the embodiment described above includes a complicated flow channel configuration such as sampler module M1 for dispensing a constant amount of sample gas to column 41 and switching module M2 that switches a state of connection between columns 41 and 42 and merge portion 30.

The flow channel configuration of the gas analysis system in the present disclosure, however, should only include at least the first column and the second column each separating a gas component, the merge portion connected to the outlet of the first column and the outlet of the second column, and the switching valve arranged between the first column and the merge portion, and does not necessarily have to include such a complicated mechanism as sampler module M1 or switching module M2 described above.

Figure 17:
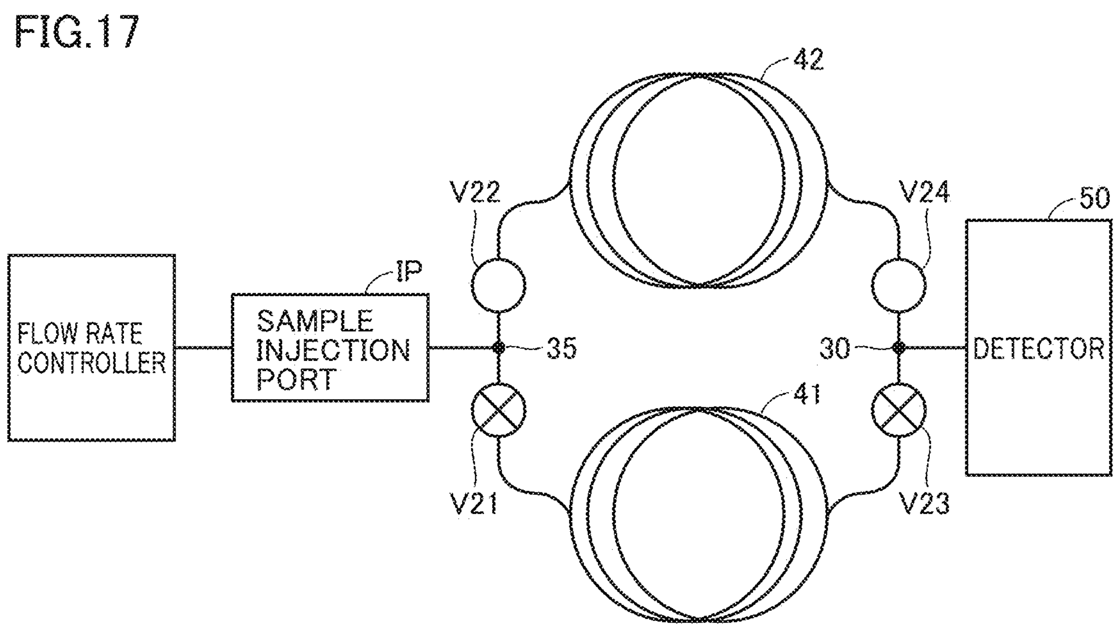
FIG. 17 is a diagram schematically showing a first modification of a flow channel configuration of the gas analysis system.

FIG. 17 is a diagram schematically showing a first modification of the flow channel configuration of the gas analysis system. In the flow channel configuration shown in FIG. 17, inlets of column 41 and 42 are connected to a single sample injection port IP with a flow diverter 35 being interposed and outlets of columns 41 and 42 are connected to detector 50 with merge portion 30 being interposed. Furthermore, switching valves V21 and V23 are arranged on the inlet side and the outlet side of column 41, respectively, and switching valves V22 and V24 are arranged on the inlet side and the outlet side of column 42, respectively.

Figure 18:
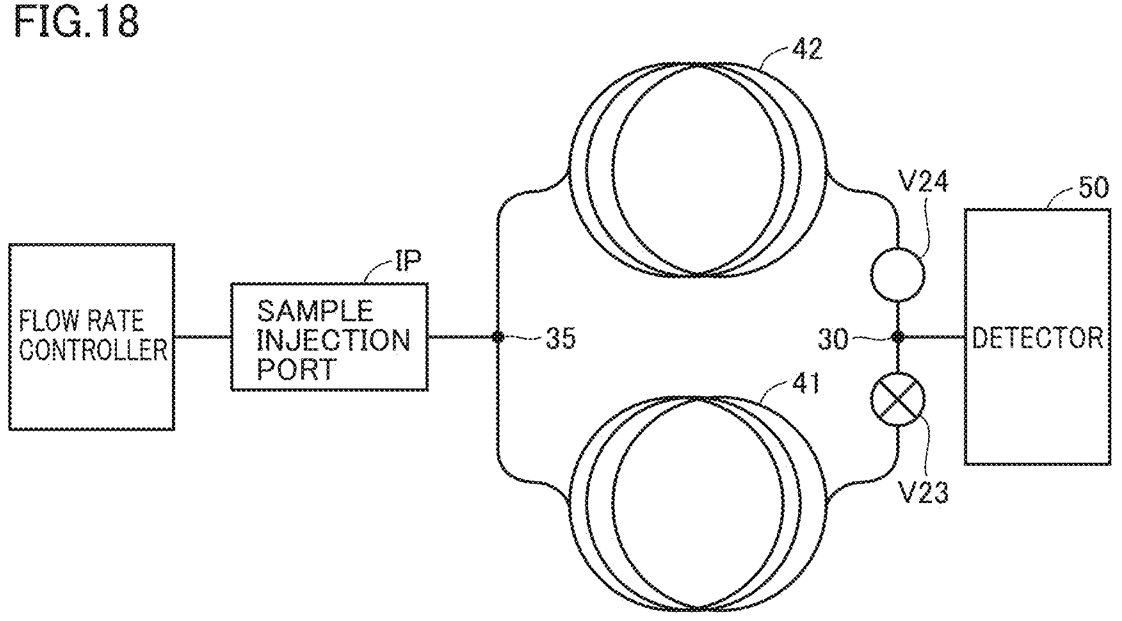
FIG. 18 is a diagram schematically showing a second modification of the flow channel configuration of the gas analysis system.

FIG. 18 is a diagram schematically showing a second modification of the flow channel configuration of the gas analysis system. The flow channel configuration shown in FIG. 18 is obtained by elimination of switching valves V21 and V22 on the inlet side of columns 41 and 42 from the flow channel configuration shown in FIG. 17.

Figure 19:
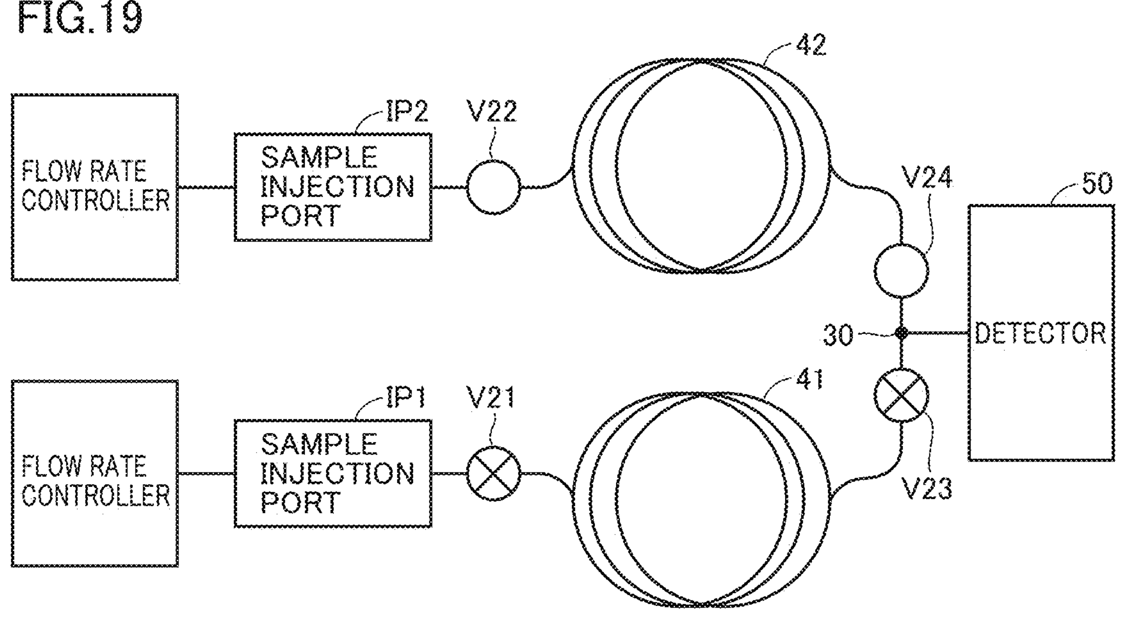
FIG. 19 is a diagram schematically showing a third modification of the flow channel configuration of the gas analysis system.

FIG. 19 is a diagram schematically showing a third modification of the flow channel configuration of the gas analysis system. In the flow channel configuration shown in FIG. 19, the inlets of columns 41 and 42 are individually connected to two respective sample injection ports IP1 and IP2, and the outlets of columns 41 and 42 are connected to detector 50 with merge portion 30 being interposed. Furthermore, switching valves V21 and V23 are arranged on the inlet side and the outlet side of column 41, respectively, and switching valves V22 and V24 are arranged on the inlet side and the outlet side of column 42, respectively. The same sample gas or completely different sample gases may be injected into two sample injection ports IP1 and IP2. In other words, sample gas separated in column 42 may be the same as or completely different from sample gas separated in column 41.

Figure 20:
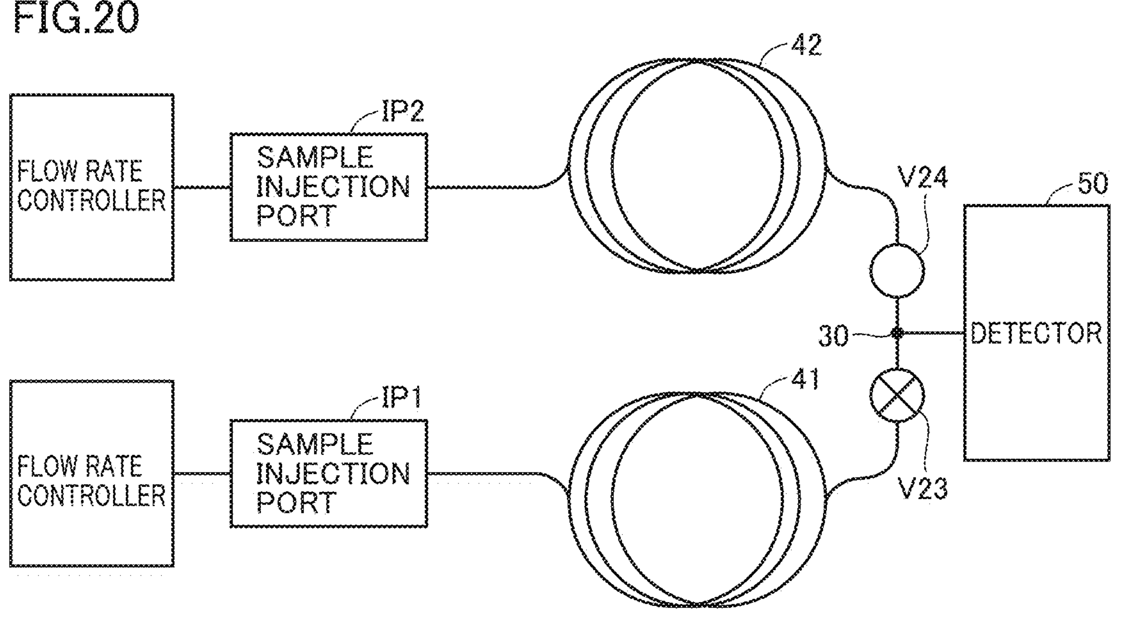
FIG. 20 is a diagram schematically showing a fourth modification of the flow channel configuration of the gas analysis system.

FIG. 20 is a diagram schematically showing a fourth modification of the flow channel configuration of the gas analysis system. The flow channel configuration shown in FIG. 20 is obtained by elimination of switching valves V21 and V22 on the inlet side of columns 41 and 42 from the flow channel configuration shown in FIG. 19.

The flow channel configuration of the gas analysis system in the present disclosure may be the flow channel configuration shown in any one of FIGS. 17 to 20.

Specifically, by the delay processing described above onto switching valve V23 arranged on the outlet side of column 41 in the flow channel configuration shown in any one of FIGS. 17 to 20, coincidence between timing of detection of the gas component separated in column 42 and timing of detection of the gas component separated in column 41 can readily be avoided without bothersome adjustment works by a skilled worker.

ASPECTS

The embodiment and the modification thereof described above are understood by a person skilled in the art as specific examples of aspects below.

(Clause 1) A gas analysis system according to one aspect includes a first column that separates a gas component contained in sample gas, a second column that separates a gas component contained in the sample gas, a detector that detects the gas components introduced from the first column and the second column, a valve that switches gas introduction from the first column into the detector, and a controller that performs delay processing of switching the valve between open and closed states so that timing of start of introduction of the gas component separated in the first column into the detector is delayed to be later than timing of completion of introduction of the gas component separated in the second column into the detector.

According to the gas analysis system described in Clause 1, the gas component separated in the first column and the gas component separated in the second column are introduced into a common detector. Therefore, the number of detectors can be smaller than in an example in which the gas component separated in the first column and the gas component separated in the second column are introduced into detectors different from each other.

In such a configuration, with arrangement of the valve that switches gas introduction from the first column to the detector and simplified processing of switching this valve between the open and closed states, timing of start of introduction of the gas component separated in the first column into the detector can be delayed to be later than timing of completion of introduction of the gas component separated in the second column into the detector. Coincidence between timing of detection of the gas component separated in the second column and timing of detection of the gas component separated in the first column can thus readily be avoided without bothersome adjustment works by a skilled worker.

Consequently, the gas analysis system in which gas components separated in a plurality of columns can readily be detected with detector(s) smaller in number than columns can be provided.

(Clause 2) In the gas analysis system described in Clause 1, in the delay processing, the controller may control the valve to close to enclose in the first column, the gas component separated in the first column while the gas component separated in the second column is being introduced into the detector.

According to the gas analysis system described in Clause 2, with simplified processing for closing the valve that switches gas introduction from the first column into the detector to temporarily enclose in the first column, the gas component in the first column, timing of elution from the first column, of the gas component in the first column can be delayed.

(Clause 3) In the gas analysis system described in Clause 2, the controller controls the valve to open to introduce the gas component separated in the first column into the detector after the controller performs the delay processing.

According to the gas analysis system described in Clause 3, with simplified processing for opening the valve after the delay processing, the gas component temporarily enclosed in the first column can be introduced into the detector and detected.

(Clause 4) In the gas analysis system described in any one of Clauses 1 to 3, the valve includes a base portion provided with an flow inlet for introduction of gas into the inside and an flow outlet for flow of gas introduced from the flow inlet to the outside and a diaphragm portion arranged as being opposed to the base portion, the diaphragm portion elastically deforming to switch between flow and cut-off of gas from the flow inlet to the flow outlet.

According to the gas analysis system described in Clause 4, a dead volume in the inside of the valve can be very small. Therefore, an extent of diffusion of the gas component in the first column in a direction of a column length at the time when the valve is closed can be minimized. Increase in bandwidth of a peak due to diffusion can thus be suppressed.

(Clause 5) In the gas analysis system described in Clause 4, the first column may be a capillary column.

According to the gas analysis system described in Clause 5, the capillary column is adopted as the first column, so that increase in bandwidth of the peak due to diffusion can more appropriately be suppressed than in an example where a packed column is adopted as the first column.

Specifically, the packed column is relatively large in inner diameter, and the column inner diameter is large relative to a bandwidth occupied by a gas component in the column. Therefore, diffusion has a large impact on increase in bandwidth of the peak. In contrast, the capillary column is relatively small in inner diameter, and the column inner diameter is very small relative to the bandwidth occupied by the gas component in the column. Therefore, diffusion has a very small impact on increase in bandwidth of the peak. Therefore, by employing the capillary column rather than the packed column for the first column, increase in bandwidth of the peak due to diffusion can more appropriately be suppressed.

(Clause 6) In the gas analysis system described in any one of Clauses 1 to 3, the first column may be a column for primary separation and the second column may be a column for secondary separation for further separation of the gas component primarily separated in the first column. A switching module may further be arranged between the first column and the second column, the switching module being configured to switch between a serial state in which the first column and the second column are connected in series in this order to the detector and a parallel state in which the first column and the second column are connected in parallel to the detector. The controller may perform the delay processing when the switching module is in the parallel state.

According to the gas analysis system described in Clause 6, with simplified processing of switching the valve that switches gas introduction from the first column into the detector, between the open and closed states in the configuration in which the gas component primarily separated in the first column and the gas component secondarily separated in the second column are introduced into the common detector, coincidence between timing of detection of the gas component secondarily separated in the second column and timing of detection of the gas component primarily separated in the first column can readily be avoided.

(Clause 7) The gas analysis system described in Clause 1 may further include a merge portion connected to an outlet of the first column and an outlet of the second column, and the detector may detect the gas component introduced from the merge portion.

Though the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A gas analysis system comprising:

a first column that separates a gas component contained in sample gas;

a second column that separates a gas component contained in the sample gas;

a detector that detects the gas components introduced from the first column and the second column;

a valve that switches gas introduction from the first column into the detector;

a controller that performs delay processing of switching the valve between open and closed states so that timing of start of introduction of the gas component separated in the first column into the detector is delayed to be later than timing of completion of introduction of the gas component separated in the second column into the detector, and a switching module arranged between the first column and the second column, the switching module being configured to switch between a serial state in which the first column and the second column are connected in series in this order to the detector and a parallel state in which the first column and the second column are connected in parallel to the detector, wherein the first column is a column for primary separation, wherein the second column is a column for secondary separation for further separation of the gas component primarily separated in the first column, and wherein the controller performs the delay processing when the switching module is in the parallel state.

2. The gas analysis system according to claim 1, wherein in the delay processing, the controller controls the valve to close to enclose in the first column, the gas component separated in the first column while the gas component separated in the second column is being introduced into the detector.

3. The gas analysis system according to claim 2, wherein the controller controls the valve to open to introduce the gas component separated in the first column into the detector after the controller performs the delay processing.

4. The gas analysis system according to claim 1, wherein the valve includes a base portion provided with a flow inlet for introduction of gas into inside and a flow outlet for flow of gas introduced from the flow inlet to outside, and a diaphragm portion arranged as being opposed to the base portion, the diaphragm portion elastically deforming to switch between flow and cut-off of gas from the flow inlet to the flow outlet.

5. The gas analysis system according to claim 4, wherein the first column is a capillary column.

6. The gas analysis system according to claim 1, further comprising:

a merge portion connected to an outlet of the first column and an outlet of the second column, wherein the detector detects any one of the gas components introduced from the merge portion.

* * * * *